United States Patent
Hokkirigawa et al.

(10) Patent No.: US 6,783,433 B2
(45) Date of Patent: *Aug. 31, 2004

(54) POLISHING-WASHING METHOD

(75) Inventors: Kazuo Hokkirigawa, Yonezawa (JP); Motoharu Akiyama, Nagano-ken (JP); Noriyuki Yoshimura, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 12 days.

This patent is subject to a terminal disclaimer.

(21) Appl. No.: 10/125,801

(22) Filed: Apr. 18, 2002

(65) Prior Publication Data

US 2002/0173239 A1 Nov. 21, 2002

(30) Foreign Application Priority Data

Apr. 19, 2001 (JP) .................................. 2001-121615

(51) Int. Cl.$^7$ .............................................. B24C 1/00
(52) U.S. Cl. .............................. 451/39; 451/88; 451/40
(58) Field of Search ............................. 451/40, 38, 87, 451/88, 39; 41/39

(56) References Cited

U.S. PATENT DOCUMENTS

| | | | |
|---|---|---|---|
| 4,827,678 A | * 5/1989 | MacMillan et al. | 451/39 |
| 4,947,591 A | * 8/1990 | Risley | 451/39 |
| 4,987,104 A | 1/1991 | Trigg | |
| 5,575,705 A | * 11/1996 | Yam et al. | 451/39 |

FOREIGN PATENT DOCUMENTS

| | | |
|---|---|---|
| GB | 2 072 062 | 9/1981 |
| GB | 2 168 333 | 6/1986 |
| GB | 2 337 953 | 12/1999 |
| JP | 52000799 | 1/1977 |
| JP | 54-90000 | 7/1979 |
| JP | 01028210 | 1/1989 |

OTHER PUBLICATIONS

*Development of Hard Porous Carbon Materials "RB Ceramics" by using Rice Bran*, Material Report R&D, May, 1997, vol. 17, No. 5 (Japanese language, 1 page).
Article: *Development of Hard and Porous Carbon Material "RB Ceramics" Using Rice Bran as a Starting Material*; (Translation from "Zairyou Kagaku", vol. 17, No. 6, pp. 24 to 27, May 1997); Kazuo Hokkirigawa; 10 pages.

* cited by examiner

*Primary Examiner*—Hadi Shakeri
(74) *Attorney, Agent, or Firm*—Flynn, Thiel, Boutell & Tanis, P.C.

(57) ABSTRACT

A polishing-washing method includes the steps of providing a polishing media containing a fine powder of an RB ceramic and/or CRB ceramic and bringing a medium stream containing the polishing media into contact with the surfaces of a body to be worked. In this method, the polishing media solution obtained after the polishing-washing can be re-used by recycling after simply separating the particles of metal oxides and the particles of removed burrs and cutting metal chips from the solution composition by utilizing a difference in specific gravity.

10 Claims, 1 Drawing Sheet

POLISHING-WASHING METHOD

FIELD OF THE INVENTION

The invention relates to a polishing-washing method for removing the particles of oxides formed upon working and the particles of removed burrs and cutting metal chips that are left on precision-worked surfaces such as of turbine blades.

BACKGROUND OF THE INVENTION

The turbine blades are formed, by electrical discharge machining, on the surfaces there of with a concave-shaped pattern receiving a fluid. At the peripheries of the discharge-machined, concave-shaped pattern, there are left the particles of oxides of an alloy used as a base material and the particles of removed burrs and cutting metal chips. In order to remove the particles of the metal oxides of the alloy and the burrs, it has been usual that polishing-washing is carried out by utilizing a water jet or ultrasonic waves while using a polishing media.

The polishing media is in the form of fine particles and is selected from silica, calcium oxide, aluminum oxide, silicon nitride, silicon carbide, cesium oxide, synthetic or natural diamond, metal silicides, tungsten oxide, titanium nitride, titanium oxide, other types of materials that are harder than an alloy used as a constituent base material for the turbine blade, and mixtures thereof.

However, there arise the problems that if a hard polishing media such as of diamond particles is used, the particles may intrude into the surfaces of the base material for the turbine blade and polishing may not proceed satisfactorily when using a relatively soft polishing media.

Further, the particles of metal oxides of an alloy used as a base material for the turbine blade or the particles of removed burrs and cutting metal chips have substantially the same specific gravity as the polishing media, with the attendant problem that it is difficult to separate the particles of the metal oxides and the particles of the removed burrs and cutting metal chips from a polishing media solution composition containing the particles of the metal oxides of the alloy and the particles of the removed burrs and cutting metal chips therein. Further, since the specific gravity of those media is high in respect to water as a fluid, there is a problem that upon making a mixed fluid containing the media, it is difficult to obtain a mixture in which the media remains uniformly mixed in the long term since the media starts to separate indefinably due to different specific gravity and depending on the rate of the media contained in the mixture.

SUMMARY OF THE INVENTION

In the practice of the invention, there is provided a polishing-washing method using a hard, light RB ceramic and/or CRB ceramic polishing media, in which a polishing media solution composition is re-used by recycling after subjecting the surfaces of a precision-worked base material to polishing-washing in an efficient manner and simply separating the particles of metal oxides or the particles of removed burrs and cutting metal chips from the polishing media solution composition after the polishing-washing by utilizing the difference in specific gravity.

The polishing-washing method of the invention could solve the above problems, in which an RB ceramic and/or CRB ceramic in the form of a fine power whose bulk specific gravity ranges about 1.20 to 1.40 $(g.cm^{-3})$ (the bulk specific gravity was measured such that the test piece described in JIS R 1601.4 was subjected to the measuring method of bulk specific gravity described in JIS R 7222.7 and it is to be noted that the RB ceramic and/or CRB ceramic is so porous that only a bulk specific gravity can be measured) is used as a polishing media.

More particularly, the RB ceramic and/or CRB ceramic is porous, has such a hardness that the Vickers' hardness is about 400 or over, can be divided into a fine powder having a size of approximately 1 $\mu$m, is not so hard as diamond and is not thus intruded into an alloy in the surface of a base material, and is small in bulk specific gravity. Accordingly, if such a ceramic is dispersed in an aqueous surfactant solution having substantially the same specific gravity to provide a polishing media solution composition, the particles of metal oxides and particles of removed burrs and cutting metal chips can be settled only by allowing the solution to stand after polishing-washing. The removal of the resultant precipitate by filtration makes it possible to provide a refreshed polishing media solution composition for recycling.

The RB ceramic and CRB ceramic used in the invention are those materials prepared according to the following process.

The porous carbon material that is obtained by using rice bran produced at 900,000 tons per year in Japan and at 33,000,000 tons per year in the world is known according to the studies made by Kazuo HOKKIRIGAWA, one of the co-inventors of this application (see "Functional Materials" May 1997, Vol. 17, No. 5, Pp. 24 to 28).

In this literature, reference is made to a carbon material (hereinafter referred to as RB ceramic) and the preparation thereof, wherein the material is obtained by blending and kneading defatted bran derived from rice bran and a thermosetting resin, followed by drying a molded compact obtained by pressure forming and subsequently baking the dried compact in an atmosphere of an inert gas.

According to this method, the difference in contraction ratio between the size of the pressure-formed compact and the size of the final molded compact obtained by baking in the inert gas atmosphere is at 25%, which makes it substantially difficult to make a precise molded compact. A ceramic (CRB ceramic) improved in the ratio has now been developed. The RB ceramic and the CRB ceramic individually have the following general properties.

Higher hardness.
Smaller expansion coefficient.
Porous microstructure.
Good Electrical conductivity.
Small bulk density and light weight.
Good abrasion resistance.
  Easy to form and easy to fabricate in a die.
  The ceramic can be divided into fine powder.
The materials being made of rice bran, they have little
  adverse effect on the global environment, leading to
  conservation of natural resources.

The CRB ceramic used in the invention is an improved material of the RB ceramic that is obtained from defatted bran, derived from rice bran, and a thermosetting resin. More particularly, the defatted bran derived from rice bran and a thermosetting resin are mixed and kneaded and subjected to primary baking in an inert gas at a temperature range of 700° C. to 1000° C., pulverizing the kneaded mixture after the primary baking into carbonized powders passing through a sieve at a level of 60 mesh or below. The carbonized powder and a thermosetting resin are further mixed and kneaded, and pressure formed at a pressure of 20 Mpa to 30 Mpa, and subjecting the compact again to a heat treatment in an inert gas at a temperature range of 100° C. to 1100° C. to obtain a black resin or porous ceramic. The greatest difference from the RB ceramic resides in that while the contraction ratio between the size of a final compact and the size at the time of molding of the RB ceramic is as large as 25%, the CRB ceramic is excellent in that the ratio is as small as 3% or below. In the invention, however, compacts are not made and a fine powder is used, so that such a difference is not utilized at all. In this sense, either the RB ceramic or CRB ceramic can be fundamentally used.

In the RB ceramic and/or CRB ceramic used in the invention, the specific gravity thereof is important: this is greatly influenced by the primary baking temperature for the RB ceramic and the primary baking temperature and the secondary heat treatment temperature for the CRB ceramic.

Generally, a higher primary baking temperature and a higher secondary heat treatment temperature result in an RB ceramic or CRB ceramic having a smaller specific gravity.

BRIEF DESCRIPTION OF THE DRAWING

The sole FIGURE is a schematic view showing a polishing-washing system according to the invention.

PREFERRED EMBODIMENTS OF THE INVENTION

Figure 1:
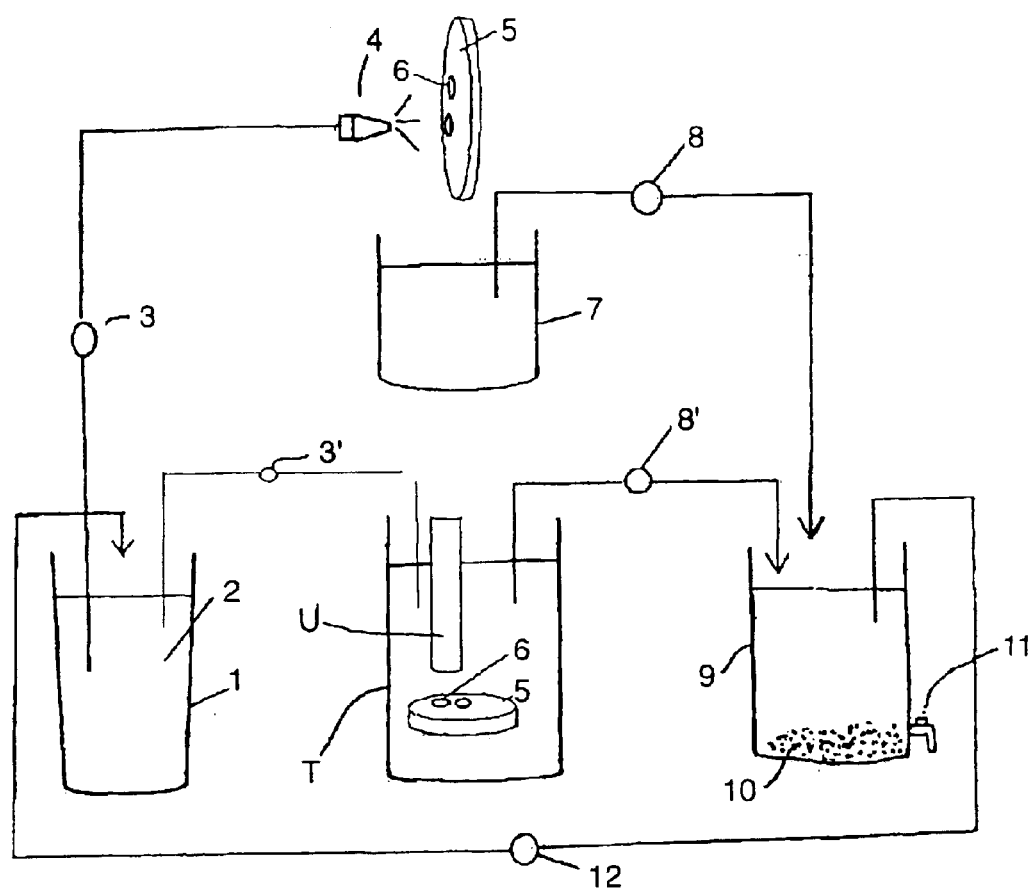

The polishing media used in the invention should comprise fine particles of the RB ceramic and/or CRB ceramic. In the practice of the invention, conventional polishing media may be used in combination within a range not departing from the spirit of the invention.

The polishing media used in combination include silica, calcium oxide, aluminum oxide, silicon nitride, silicon carbide cesium oxide, synthetic or natural diamond, a metal silicide, tungsten oxide, titanium nitride, titanium oxide, other types of materials that are harder than a base material constituting a body to be worked, and mixtures thereof.

The polishing-washing method used in the invention includes a polishing-washing method using a water jet or ultrasonic waves. Both polishing-washing methods are well known in the art and are not described in detail herein.

With the polishing-washing method of the invention, when a dispersion medium containing polishing media obtained after polishing-washing is repeatedly reused, the difference in specific gravity is utilized, and thus, the dispersion medium solution is allowed only to stand, whereupon the particles of metal oxides formed during the course of working and the particles of removed burrs and cutting metal chips settle from the dispersion medium solution containing the polishing media. The resultant precipitate is removed by a method such as filtration to obtain a fresh polishing media solution composition, which can be recycled.

As is particularly shown in FIG. 1, a polishing media solution composition 2 is pumped up from a storage tank 1, in which the polishing media solution composition 2 is placed, by means of a pump 3, and worked portions 6 of a body 5 to be worked is subjected to polishing-washing by means of a water jet gun 4. The polishing media solution composition after the polishing-washing is collected in a temporary storage tank 7 receiving a once treated polishing media solution composition. This is transferred to a standing tank 9 by means of a pump 8. In the standing tank 9, the polishing media solution composition, which contains the particles of metal oxides and the particles of removed burrs and cutting metal chips formed in the course of the processing over about 1 to 24 hours is allowed to stand. The particles of the metal oxides and the particles of the removed burrs and cutting metal chips, in most cases, have a specific gravity of approximately 4.0 to 7.0, whereas the bulk specific gravity of the RB ceramic and/or CRB ceramic used as the polishing media of the invention is at approximately 1.22 to 1.4. In addition, the solvent for the polishing media used has a specific gravity of approximately 1.2 to 1.5. Eventually, a precipitate 10 is formed only of the particles of the metal oxides and the particles of the removed burrs and cutting metal chips. Thereafter, a supernatant liquid portion in the standing tank 9 is recycled, by means of a recycling pump 12, to the storage tank 1 as a polishing media solution composition containing the RB ceramic and/or CRB ceramic that is a polishing media of the invention. It will be noted that the precipitate may be appropriately withdrawn from a precipitate withdrawal port 11.

Furthermore, in another embodiment, there may be used an ultrasonic wave tank T capable of imposing ultrasonic vibrations in place of the water jet gun 4. The polishing media solution composition after having been used over a given time in the ultrasonic wave tank T is passed to the standing tank 9 by means of a pump 8'. In the standing tank 9, the polishing media solution composition containing the particles of metal oxides formed in the course of processing and the particles of removed burrs and cutting metal chips is allowed to stand over about 1 to 24 hours, so that the particles of the metal oxides and the particles of the burrs can be separated therefrom.

The RB ceramic and/or CRB ceramic used as the polishing media in the invention should preferably be one which is obtained by baking at relative high temperatures and has a specific gravity of from about 1.2 to 1.4, more preferably from about 1.22 to 1.35.

The solvent used in the invention may be any one which is able to suspend the particles of the polishing media therein, for which water, acids, alcohols and mixtures thereof are preferably used.

Auxiliary additives may be added to the composition containing the polishing media. Potassium chloride, ammonium chloride, sodium sulfate or a combination thereof may be used as the auxiliary additive, which not only acts to increase the specific gravity of the solution, but also can facilitate the polishing effect of a metal surface with a polishing material.

Moreover, the final pH of the solution can be appropriately adjusted by addition of an acid or a base. The final solution composition can be diluted by adding a solvent to the above parent solution in an amount sufficient to obtain a desired viscosity and ratio of the solid components. The final ratio of the solid components can be within a range of about 5 to 50 wt. %.

In the practice of the invention, surface active agents may be used in order to enhance the dispersability and washing effect. The surface active agents usable in the invention are selected from anionic surface active agents, amphoteric surface active agents, nonionic surface active agents and cationic surface active agents.

Examples of the anionic surface active agent include fatty acid salts such as potassium laurate, potassium myristate, potassium oleate and the like, alkylsulfates such as sodium laurylsulfate, ammonium laurylsulfate, triethanolamine laurylsulfate and the like, alkylbenzenesulfonates such as sodium dodecylbenzenesulfonate, N-acylamino acid salts such as sodium lauroylsarcosine, potassium lauroylsarcosine and the like, alkyl ether carboxylates such as sodium polyoxyethylene tridecyl ether acetate, N-acyltaurine salts such as sodium N-lauroylmethyltaurine, sodium N-cocoylmethyltaurine and the like, N-acylalanine salts such as sodium lauroylmethylalanine, sulfonates such as sodium laurylsulfoacetate, polyoxyethylene alkyl ether sulfates such as sodium polyoxyethylene lauryl ether sulfate, triethanolamine polyoxyethylene alkyl ether sulfate and the like, alkanesulfonates such as sodium tetradecanesulfonate, sodium pentadecanesulfonate and the like, α-olefinsulfonates such as sodium tetradecenesulfonate, alkyl phosphates such as sodium laurylphosphate, and polyoxyethylene alkyl ether phosphates such as sodium polyoxyethylene lauryl ether phosphate.

Examples of the amphoteric surface active agent include acetic acid betaine-type agents such as lauryldimethylaminoacetic acid betaine, lauric acid amidopropyldimethylaminoacetic acid betaine, coconut oil fatty acid amidopropyldimethylaminoacetic acid betaine and the like, and imidazoline-type agents such as sodium N-coconut oil fatty acid acyl-N-carboxymethyl-N-hydroxyethylethylenediamine.

Examples of the nonionic surface active agent include polyoxyethylene alkyl ethers such as polyoxyethylene lauryl ether, and alkylalkanolamides, and the like. Examples of the cationic surface active agent include alkylammonium salts such as lauryltrimethylammonium chloride, lauryldimethylamine oxide and the like.

The surface active agents not only have stain removability as a detergent, but also enhance the dispersability of the media.

The surface active agent is preferably used in an amount of 0.5 to 6 wt. % based on water serving as a dispersion medium. If the amount of a surface active agent is less than 0.5 wt. %, the detergent power is weak. When the amount exceeds 6 wt. %, the rinsing properties worsen. The surface active agents may be used singly or in combination of two or more.

The embodiments of the invention can be summarized as follows.

(1) A polishing-washing method comprising providing a polishing media containing a fine powder of an RB ceramic and or CRB ceramic and bringing the surface of a worked body into contact with a medium stream containing the polishing media.

(2) The polishing-washing method as recited in (1) above, wherein the polishing-washing is performed by use of a water jet.

(3) The polishing-washing method as recited in (1) or (2) above, wherein the polishing-washing is performed by use of ultrasonic waves in water.

(4) The polishing-washing method as recited in any one of 1 to 3 above, wherein a dispersion medium for the polishing media is made of an aqueous dispersion medium containing a surface active agent.

(5) The polishing-washing method as recited in any one of 1 to 4 above, wherein the dispersion medium for the polishing media comprises potassium chloride, ammonium chloride, sodium sulfate or a combination thereof as an auxiliary additive.

(6) The polishing-washing method as recited in any one of 1 to 5 above, wherein the fine powder of the RB ceramic and/or CRB ceramic has an average particle size of 1 μm to 1,000 μm.

(7) The polishing-washing method as recited in any one of 1 to 6 above, wherein the dispersion medium for the polishing media has a specific gravity of about 1.1 to 1.4.

(8) The polishing-washing method as recited in any one of 1 to 7 above, wherein heavier fine particles are separated from the dispersion medium after the washing by use of a difference in specific gravity and the resultant dispersion medium is circulated without collection of the RB ceramic or CRB ceramic powder.

EXAMPLE 1

A CRB ceramic is prepared in the following way.
(Preparation of CRB Ceramic)

75 kg of defatted bran derived from rice bran and 25 kg of a liquid phenolic resin (resol) were mixed and kneaded while heating to 50° C. to 60° C. A plastic, homogeneous mixture was obtained.

The mixture was subjected to a primary baking at 900° C. in a nitrogen atmosphere in a rotary kiln for 60 minutes. The resultant carbonized, baked compact was screened through a 100 mesh sieve, thereby obtaining carbonized powders 50 to 250 μm in particle diameter.

75 kg of thus obtained carbonized powder was mixed and kneaded with 25 kg of a solid phenolic resin (resol) while heating to 100° C. to 150° C. A plastic homogeneous mixture was obtained.
(Preparation of Polishing Media)

Next, the plastic compact was pressure formed into a round body having a diameter of 3 cm at a pressure of 20 Mpa. The die was set at a temperature of 150° C.

The molded compact was removed from the die, and was heated to a temperature of 500° C. in an atmosphere of nitrogen at a heating rate of 1° C./minute and maintained at 500° C. for 60 minutes, followed by baking at 900° C. for about 120 minutes.

Subsequently, the temperature was lowered at a cooling rate of 2 to 3° C./minute until reaching 500° C., and upon the temperature dropping below 500° C., they were left to cool by themselves.

The round body having a diameter of 3 cm was placed in a crusher and crushed into pieces. The pieces were more finely crushed by use of a ball mill.

In this way, primary fine particles of the CRB ceramic having an average size of 5 to 10 μm were obtained.
(Preparation of a Polishing Media Solution Composition)

2 kg of the primary fine particles of the CRB ceramic having a bulk density of 1.22 and an average size of 5 μm, 10 kg of water, 1 kg of potassium chloride, 1.3 kg of sodium sulfate, and 0.5 kg of potassium laurate serving as an anionic surface active agent were mixed at room temperature and placed in a ball mill to prepare a homogeneous polishing media solution composition. The dispersion medium for the polishing media was at about 1.22.
(Polishing-washing with Water Jet)

As shown in FIG. 1, a polishing media solution composition 2 was pumped up from a storage tank 1, in which the polishing media solution composition 2 was placed, by means of a pump 3, followed by polishing-washing of worked portions 6, which had been subjected to electrical discharge machining, of a turbine blade 5 to be worked through a water jet gun 4.

The polishing media solution composition 2 after the polishing-washing was collected in a temporary storage tank 7 where a used polishing media solution composition was received. The thus collected polishing media solution composition after the polishing-washing contained the particles of metal oxides formed in the course of the working and the particles of removed burrs and cutting metal chips. This was passed to a standing tank 9 by means of a pump 8. In the standing tank 9, the polishing media solution composition containing the particles of the metal oxides formed upon the working and the particles of the removed burrs and cutting metal chips was allowed to stand over about 8 hours.

The particles of the metal oxides and the particles of the removed burrs and cutting metal chips, respectively, had a specific gravity of approximately 4.0 to 7.0. Because the RB ceramic and/or CRB ceramic used as the polishing media of the invention has a bulk specific gravity of approximately 1.22 and the dispersion medium for the polishing media also has a specific gravity of 1.22, only the particles of the metal oxides and the particles of the removed burrs and cutting metal chips were permitted to settle quickly. The polishing media solution composition containing the RB ceramic and/or CRB ceramic used as the polishing media of the invention was recycled from a supernatant portion in the standing tank 9 to the storage tank 1 by means of a recycling pump 12.

EXAMPLE 2
(Preparation of CRB Ceramic)

75 kg of defatted bran derived from rice bran and 25 kg of a liquid phenolic resin (resol) were mixed and kneaded while heating to 50° to 60° C. A plastic homogeneous mixture was obtained.

The mixture was subjected to a primary baking at 900° C. in a nitrogen atmosphere in a rotary kiln for 60 minutes. Subsequently, a baked compact obtained was screened through a 60 mesh sieve, thereby obtaining carbonized powders 50 to 250 $\mu$m in particle diameter.

75 kg of the thus obtained carbonized powder was mixed and kneaded with 25 kg of a solid phenolic resin (resol) while heating to 100° C. to 150° C. A plastic homogeneous mixture was obtained.
(Preparation of Polishing Media)

Next, the plastic compact was pressure formed into a round body having a diameter of 3 cm at a pressure of 20 Mpa. The die was set at a temperature of 150° C.

The molded compact was removed from the die, and was heated to a temperature of 500° C. in an atmosphere of nitrogen at a heating rate of 1° C./minute and maintained at 500° C. for 60 minutes, followed by baking at 800° C. for about 120 minutes.

Subsequently, the temperature was lowered at a cooling rate of 2 to 3° C./minute until reaching 500° C., and upon the temperature dropping below 500° C. they were left to cool by themselves.

The round body having a diameter of 3 cm was placed in a crusher and crushed into pieces. The pieces were more finely crushed by use of a ball mill.

In this way, primary fine particles of the CRB ceramic having an average size of 5 to 10 $\mu$m were obtained.
(Preparation of a Polishing Media Solution Composition)

2 kg of the primary fine particles of the CRB ceramic having a bulk density of 1.25 and an average size of 5 $\mu$m, 10 kg of water, 1 kg of potassium chloride, 1.6 kg of sodium sulfate, and 0.5 kg of potassium laurate serving as an anionic surface active agent were mixed at room temperature and subjected to a ball mill to prepare a homogeneous polishing media solution composition. The dispersion medium for the polishing media had a specific gravity of about 1.25.
(Polishing-washing in an Ultrasonic Tank)

As shown in FIG. 1, a polishing media solution composition 2 was pumped up from a storage tank 1, in which the polishing media solution composition 2 was placed, by means of a pump 3, and placed in an ultrasonic tank 7' wherein ultrasonic vibrations were imposed by means of an ultrasonic vibration device U. In the ultrasonic tank 7', polishing-washing was effected on worked portions 6, which had been machined by electrical discharge, of a turbine blade 5 to worked.

The polishing media solution composition in the ultrasonic tank 7' which was used over a given time contained the particles of metal oxides formed upon the worked portions and the particles of removed burrs and cutting metal chips. The solution was passed to a standing tank 9 by means of a pump 8'. In the standing tank 9, the polishing media solution composition, which contained the particles of the metal oxide formed upon the working and the particles of the removed burrs and cutting metal chips, was allowed to stand over about 6 hours.

The particles of the metal oxides and the particles of the removed burrs and the cutting metal chips were found to have a specific gravity of about 4.0 to 7.0, respectively. Because the RB ceramic and/or CRB ceramic used as the polishing media of the invention has a bulk specific gravity of approximately 1.25 and the dispersion medium for the polishing media also has a specific gravity of about 1.25, only the particles of the metal oxides and the particles of the removed burrs and cutting metal chips were permitted to settle quickly. The polishing media solution composition containing the RB ceramic and/or CRB ceramic used as the polishing media in the invention was recycled from a supernatant portion in the standing tank 9 to the storage tank 1 by means of a recycling pump 12.

EXAMPLE 3
(Preparation of RB Ceramic)

75 kg of defatted bran derived from rice bran and 25 kg of a liquid phenolic resin (resol) were mixed and kneaded while heating to 50° to 60° C. A plastic homogeneous mixture was obtained.

The mixture was subjected to a primary baking at 900° C. in a nitrogen atmosphere in a rotary kiln for 60 minutes. The resultant carbonized, baked compact was sieved through a 100 mesh sieve, thereby obtaining carbonized powders 50 to 250 $\mu$m in particle diameter.
(Preparation of Polishing Media)

Next, the carbonized compact was more finely crushed by use of a ball mill to obtain primary fine particles of the RB ceramic having an average size of 5 to 15 $\mu$m.
(Preparation of a Polishing Media Solution Composition)

2 kg of the primary fine particles of the RB ceramic having a bulk density of 1.30 and an average size of 5 $\mu$m, 1 kg of a silica fine powder having an average size of 3 $\mu$m, 10 kg of water, 1 kg of potassium chloride, 2.1 kg of sodium sulfate, and 0.5 kg of potassium laurate serving as an anionic surface active agent were mixed at room temperature and placed in a ball mill to prepare a homogeneous polishing media solution composition. The dispersion medium for the polishing media had a specific gravity of about 1.29.
(Polishing-washing with Water Jet)

As shown in FIG. 1, a polishing media solution composition 2 was pumped up from a storage tank 1, in which the polishing media solution composition 2 was placed, by means of a pump 3, followed by polishing-washing of portions 6, subjected to electrical discharge machining, of a turbine blade 5 to be worked through a water jet gun 4.

The polishing media solution composition 2 after the polishing washing was collected in a temporary storage tank 7 where a used polishing media solution composition was received. The thus collected polishing media solution composition after the polishing-washing contained the particles of metal oxides formed in the course of the working and the particles of removed burrs and cutting metal chips. This was passed to a standing tank 9 by means of a pump 8. In the standing tank 9, the polishing media solution composition containing the particles of the metal oxides formed upon the working and the particles of the removed burrs and cutting metal chips was allowed to stand over about 8 hours.

The particles of the metal oxides and the particles of the removed burrs and cutting metal chips, respectively, had a specific gravity of approximately 4.0 to 7.0. Because the RB ceramic used as the polishing media in the invention has a bulk specific gravity of approximately 1.30 and the dispersion medium for the polishing media also has a specific gravity of approximately 1.29, the particles of the metal oxides and the particles of the removed burrs and cutting metal chips were permitted to settle quickly. The polishing media solution composition containing the RB ceramic used as the polishing media of the invention was recycled from a supernatant portion in the standing tank 9 to the storage tank 1 by means of a recycling pump 12.

A fresh silica fine powder was supplemented to the polishing medial solution composition substantially in the same amount as the precipitated silica fine powder, followed by continuing the polishing-washing operations.

The polishing-washing method according to the invention makes use of an RB ceramic and/or CRB ceramic which is an eco-friendly material, so that the surfaces of a precision-worked base material can be efficiently polished-washed. After completion of the polishing-washing, the particles of metal oxides and the particles of removed burrs and cutting metal chips can be simply separated from the polishing media solution composition by use of the difference in specific gravity, thereby providing a polishing-washing method wherein the polishing media solution can be re-used by recycling.

What is claimed is:

1. A polishing-washing method comprising the steps of providing a polishing media comprising a powder of at least one of an RB ceramic and a CRB ceramic and bringing a medium stream containing the polishing media into contact with surfaces of a body being worked on to polish the body surfaces, wherein the RB ceramic comprises a carbonaceous material obtained by mixing degreased bran with a thermosetting resin to form a first mixture, kneading the first mixture, pressure-forming the kneaded first mixture, drying the pressure-formed first mixture and firing the dried first mixture in an inert gas atmosphere at a temperature in a range of 700 to 1000° C. and the CRB ceramic is obtained by mixing the carbonaceous material of the RB ceramic with a thermosetting resin to form a second mixture, kneading the second mixture, pressure-forming the kneaded second mixture at a pressure in a range of 20 to 30 MPa to form a workpiece and subjecting the workpiece to a heat treatment at a temperature in a range of 700 to 1100° C. in an inert gas atmosphere.

2. The polishing-washing method of claim 1, wherein the medium stream is brought into contact with the body surface by means of a water jet.

3. The polishing-washing method of claim 1, wherein ultrasonic waves in water are used to polish the body surfaces.

4. The polishing-washing method of claim 1, wherein the medium stream is an aqueous stream additionally containing a surface active agent.

5. The polishing-washing method of claim 1, wherein the medium stream additionally comprises at least one of potassium chloride, ammonium chloride and sodium sulfate.

6. The polishing-washing method of claim 1, wherein the powder of at least one of an RB ceramic and CRB ceramic has an average size of 1 to 1000 μm.

7. The polishing-washing method of claim 1, wherein the medium stream has a specific gravity of about 1.1 to 1.4.

8. The polishing-washing method of claim 1, additionally comprising the steps of regenerating a spent medium stream by allowing contaminants to settle out due to the difference in specific gravity between the contaminants and the polishing media and recirculating the regenerated spent medium to polish the body surfaces.

9. The polishing-washing method of claim 1, wherein a CRB ceramic is not used to form the polishing media.

10. The polishing-washing method of claim 1, wherein an RB ceramic is not used to form the polishing media.

* * * * *